(12) United States Patent
Takemoto et al.

(10) Patent No.: US 9,354,627 B2
(45) Date of Patent: May 31, 2016

(54) CONTROL METHOD, CONTROL COMPUTER PROGRAM, AND CONTROL SYSTEM FOR WORK MACHINE

(71) Applicant: Komatsu Ltd., Tokyo (JP)

(72) Inventors: Toshiyuki Takemoto, Hiratsuka (JP); Kazuhiro Yoshida, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/359,703

(22) PCT Filed: Dec. 11, 2013

(86) PCT No.: PCT/JP2013/083262
§ 371 (c)(1),
(2) Date: May 21, 2014

(87) PCT Pub. No.: WO2015/040761
PCT Pub. Date: Mar. 26, 2015

(65) Prior Publication Data
US 2015/0301518 A1 Oct. 22, 2015

(51) Int. Cl.
*G06F 7/00* (2006.01)
*G06F 19/00* (2011.01)
*G05B 19/408* (2006.01)
*G06Q 50/08* (2012.01)
*E02F 9/26* (2006.01)
*G07C 5/02* (2006.01)
*G07C 5/08* (2006.01)

(52) U.S. Cl.
CPC ............... *G05B 19/408* (2013.01); *E02F 9/26* (2013.01); *G06Q 50/08* (2013.01); *G07C 5/02* (2013.01); *G07C 5/0841* (2013.01); *G05B 2219/2616* (2013.01); *G05B 2219/31467* (2013.01); *Y02P 90/10* (2015.11)

(58) Field of Classification Search
CPC .................. G05B 19/408; G05B 2219/31467; E02F 9/26; G07C 5/0841; G07C 5/02
USPC .................................................. 701/29.1, 50
See application file for complete search history.

(56) References Cited

U.S. PATENT DOCUMENTS 6,073,062 A  6/2000 Hoshino et al.
7,925,396 B2  4/2011 Arakawa
(Continued)

FOREIGN PATENT DOCUMENTS

CN  1153950 A  7/1997
CN  101405459 A  4/2009
(Continued)

OTHER PUBLICATIONS

International Search Report and Written Opinion dated Feb. 10, 2014, issued for PCT/JP2013/083262.

*Primary Examiner* — Thomas G Black
*Assistant Examiner* — Tyler Paige
(74) *Attorney, Agent, or Firm* — Locke Lord LLP (57) ABSTRACT

A control method for a work machine, includes: acquiring a correlation between identification information for identifying operability for the work machine and operational information of the work machine, and generating a correlation between an operator who operates the work machine and the operational information by using the correlation between the identification information and the operational information and a correlation between the operator and the identification information.

10 Claims, 5 Drawing Sheets

(56) References Cited

U.S. PATENT DOCUMENTS

| | | | |
|---|---|---|---|
| 8,196,212 B2 | 6/2012 | Tsusaka et al. | |
| 2005/0278055 A1* | 12/2005 | Ferguson | G07C 5/0841 700/111 |
| 2005/0283295 A1* | 12/2005 | Normann | E02F 9/26 701/50 |
| 2007/0018796 A1* | 1/2007 | Scheer | B60R 25/04 340/425.5 |
| 2008/0077299 A1* | 3/2008 | Arshad | A01B 9/005 701/50 |
| 2009/0118895 A1 | 5/2009 | Arakawa | |
| 2010/0235922 A1 | 9/2010 | Tsusaka et al. | |
| 2011/0160994 A1* | 6/2011 | Schmidt | A01B 9/005 701/532 |
| 2013/0289873 A1* | 10/2013 | Mitchell | G06F 17/00 701/482 |
| 2015/0167461 A1* | 6/2015 | Sugihara | E21C 35/00 299/1.05 |

FOREIGN PATENT DOCUMENTS

| | | |
|---|---|---|
| JP | 2003-140743 A | 5/2003 |
| JP | 2005-032273 A | 2/2005 |
| JP | 2010-257296 A | 11/2010 |
| WO | WO-2007/122914 A1 | 11/2007 |

* cited by examiner

| SN | DN | WI | | | |
|---|---|---|---|---|---|
| | | Da | H | ... | Te |
| 1 | 1011 | Da1 | H1 | ... | Te1 |
| 2 | 1036 | Da7 | H7 | ... | Te7 |
| ⋮ | ⋮ | ⋮ | ⋮ | ⋮ | ⋮ |
| n | 1206 | Dan | Hn | ... | Ten |
| ⋮ | ⋮ | ⋮ | ⋮ | ⋮ | ⋮ |
| n+k | 1011 | Dan+k | Hn+k | ... | Ten+k |

DBM

CONTROL METHOD, CONTROL COMPUTER PROGRAM, AND CONTROL SYSTEM FOR WORK MACHINE

FIELD

The present invention relates to a control method, a control computer program, and a control system, which control operational information of a work machine.

BACKGROUND

In recent years, there is a known technology in which a control device acquires and controls operational information of a work machine such as an excavator or a dump truck via a communication line (for example, Patent Literature 1).

CITATION LIST

Patent Literature

Patent Literature 1: Japanese Patent Application Laid-open No. 2003-140743

SUMMARY

Technical Problem

Aiming to execute labor management for an operator and to grasp a state of a work machine when the operator operates the work machine, a control device may collect and totalize operational information and the like acquired by the work machine. Incidentally, from a viewpoint of protecting personal information, the personal information of an operator of the work machine may be hardly stored outside the control of the operator, for example. In other words, a person who handles the control device may hardly provide the operational information of each operator to an owner or an administrator, etc. of the work machine, correlating the personal information of the operator to the operational information totalized by the control device. Therefore, in the case where the person who handles the control device totalizing the operational information of the work machine differs from the owner who owns the work machine controlled by the control device, or the administrator, etc., the operational information and the like are not specified with the personal information of the work machine's operator and are generally provided in an ambiguous state when the operational information and the like of the work machine are provided to the owner or the administrator, etc. of the work machine. In the case where the operational information is provided in such a state, the owner, or the administrator, etc. of the work machine may hardly grasp the correlation between the operator and the operational information.

The object of the present invention is to enable the owner or the administrator, etc. to easily grasp the correlation between the operator and the operational information of the work machine while reducing time and labor to protect the personal information of the work machine operator.

Solution to Problem

According to the present invention, a control method for a work machine, comprises: acquiring a correlation between identification information for identifying operability for the work machine and operational information of the work machine, and generating a correlation between an operator who operates the work machine and the operational information by using the correlation between the identification information and the operational information and a correlation between the operator and the identification information.

In the present invention, it is preferable that the operational information for a predetermined period is totalized to generate the correlation between the operator and the operational information.

According to the present invention, a control method for a work machine, comprises: acquiring a correlation between identification information for identifying operability for the work machine and operational information of the work machine; and generating a correlation between an operator who operates the work machine and the operational information by using the correlation between the identification information and the operational information and a correlation between the operator and the identification information, wherein the operational information includes at least one of an operating date, an operating time, and fuel consumption information.

According to the present invention, a control computer program for a work machine, causing a computer to execute processing of generating a correlation between an operator who operates the work machine and operational information by using a correlation between identification information for identifying operability for the work machine and the operational information of the work machine and a correlation between the operator and the identification information.

In the present invention, it is preferable that the control computer program for a work machine includes causing the computer to execute processing of totalizing the operational information for a predetermined period to generate a correlation between the operator and the operational information.

According to the present invention, a control system for a work machine, comprises a terminal device configured to acquire a correlation between identification information for identifying operability for the work machine and operational information of the work machine, and generate a correlation between an operator who operates the work machine and the operational information by using the correlation between the identification information and the operational information and a correlation between the operator and the identification information.

In the present invention, it is preferable that the operational information for a predetermined period is totalized to generate the correlation between the operator and the operational information.

According to the present invention, a control system for a work machine provided with a work machine that acquires operational information, a control device that controls the operational information, a terminal device that controls operator information, and a report output device that outputs the operational information including the operator information, wherein the work machine comprises: a storage unit configured to store a correlation between identification information for identifying operability for the work machine and the operational information; and an output unit configured to output the correlation to outside of the work machine, wherein the control device receives the correlation and further transmits the correlation to the terminal device, and wherein the terminal device includes a computer program configured to execute processing of receiving the correlation and generating a correlation between the operational information and the operator by using the received correlation and a correlation between the operator information and the identification information, and by the processing, the operational information including the operator information is output to the report output device.

According to the present invention, the owner or the administrator, etc. can easily grasp the correlation between the operator and the operational information of the work machine while reducing the time and labor to protect the personal information of the work machine operator.

DESCRIPTION OF EMBODIMENTS

A configuration (embodiment) to implement the present invention will be described with reference to the drawings.

<Outline of Control System 100>

Figure 1:
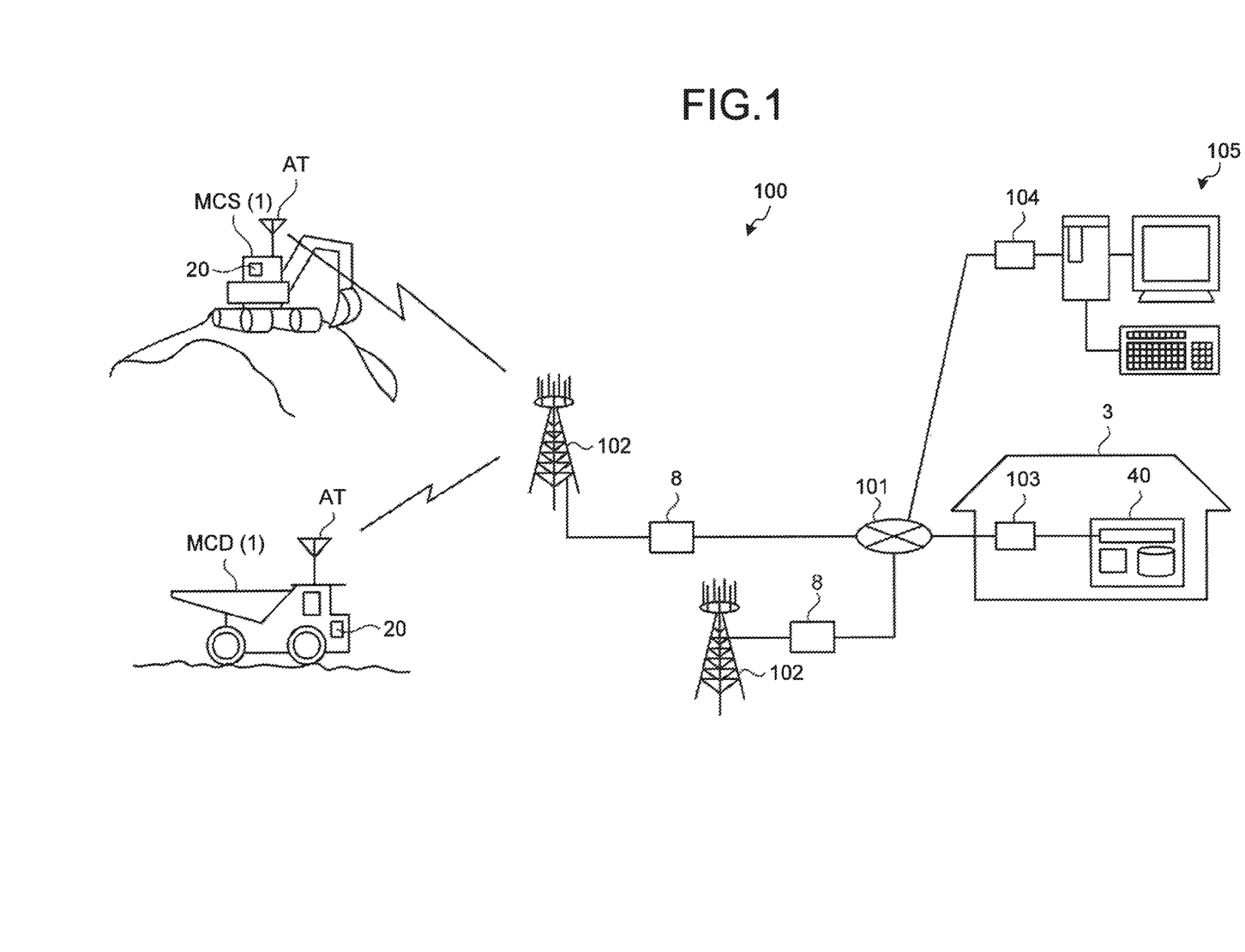
FIG. 1 is a diagram illustrating a case in which a control system of a work machine according to an embodiment of the present invention is applied.

FIG. 1 is a diagram illustrating a case in which a control system 100 of a work machine according to an embodiment of the present invention is applied. The control system 100 of the work machine (hereafter conveniently referred to as control system) controls a work machine 1 by executing a control method for the work machine 1 according to the present embodiment, causing a control device 40 to collect operational information of the work machine 1, totalize the collected operational information, and transmit the totalized operational information to a terminal device 105 via a communication line 101.

The control system 100 collects operational information of a dump truck MCD and an excavator MCS, and totalizes the collected operational information in a case illustrated in FIG. 1. According to the present embodiment, the work machine controlled by the control system 100 is not limited thereto. For instance, the control system 100 may control a wheel loader, a bulldozer, a forklift or the like. In the following, the dump truck MCD and the excavator MCS are conveniently referred to as the work machine 1.

In the control system 100, a communication terminal device 20 included in the work machine 1 and the control device 40 communicate via a radio communications system (ground wave communication) applied to mobile communication such as a cellular telephone, or via satellite communication. The communication form is not limited the mobile communication or the satellite communication, and may adopt near field communication such as a wireless LAN (Local Area Network). The control device 40 is disposed inside a control facility 3, for example. The control facility 3 may be located inside a site where the work machine 1 is operated, or in a place distant from the site where the work machine 1 is operated, such as a place where a service man or an administrator executing preventive maintenance and the like for the work machine 1 is stationed. Further, the control device 40 may be disposed in a predetermined place, or may be movable to a desired place like a mobile terminal having a function of the wireless communication.

According to the present embodiment, the control device 40 is connected to the communication line 101 via a communication device 103. The communication line 101 is connected to a switching system 8. The switching system 8 connects the communication line 101 to a base station 102. The switching system 8 interposed between the communication line 101 and a communication device included in the work machine 1 has a role to relay the communication between the communication device in the work machine and the control device 40. The base station 102 receives and modulates various kinds of information transmitted from the communication device including the communication terminal device 20 included in the work machine 1, and transmits the various kinds of information to the switching system 8.

The communication terminal device 20 included in the work machine 1 collects information related to operating state of the work machine 1 and generates the collected information as the operational information, and then transmits the operational information to the control device 40. The communication terminal device 20 executes transmission from a communication antenna AT to outside. The control device 40 receives (acquires) the various kinds of information including the operational information transmitted from the communication terminal device 20 of the work machine 1 via the base station 102, the switching system 8, the communication line 101, and the communication device 103.

The operational information include, for example, positional information (latitude, longitude, or height coordinate) related to the position of the work machine 1, an operating date and an operating time, a travel distance, an engine water temperature, information indicating a content of abnormality, a code indicating a type of the abnormality, a state of battery voltage, information related to fuel consumption, and load capacity. The information related to the fuel consumption includes a fuel residual amount, a fuel consumption amount, a fuel consumption rate, and so on. The operational information includes at least one of the above information. Note that the operating time includes either an accumulated operating time or daily operating time of the work machine 1, or both thereof. The operating time is a period in which an engine of the work machine 1 has been operated. The operational information is required to be the operational information corresponding to a type or a vehicle rank of the work machine 1. The operational information may be the information indicating the operating state of the work machine, such as where and how long the work machine has been operated, whether the work machine has been operated smoothly, or whether any abnormality has occurred. Also, the operational information is not limited to the information indicating the past operating state of the work machine and may be the information indicating current operating state. The above operational information is used for, for example, preventive maintenance and fault diagnosis for the work machine 1. According to the present embodiment, the operational information includes at least one of the operating date, the operating time, and the information related to the fuel consumption at least.

The control device 40 is capable of updating a computer program stored in a storage device included in the work machine 1, requesting an electronic device and the like included in the work machine 1 to execute a predetermined processing, and transmitting an command or information to the work machine 1 in order to change setting of a function of the electronic device and the like, in addition to collecting the operational information from the work machine 1. In this case, the control device 40 transmits, to the communication line 101, the command or information to be transmitted to the work machine 1 via the communication device 103. The command or information is modulated at the switching system 8 and transmitted from the base station 102 in a radio wave form. The radio wave including the command or information, which is transmitted from the base station 102 and supplied to the work machine 1, is received by the communication antenna AT of the work machine 1.

The communication terminal device 20 of the work machine 1 executes demodulation and conversion to the radio wave received by the communication antenna AT such that the radio wave is changed back to the original information readable by the communication terminal device 20 later described, and then transmits the information to the communication terminal device 20 of the work machine 1. Thus, the work machine 1, more specifically, the communication terminal device 20 and the control device 40 can mutually exchange the information, using the wireless communication. Next, the work machine 1, the control device 40, and the control system 100 will be described more in detail.

The terminal device 105 connected to the control device 40 is used by an owner of the work machine 1 or an administrator, etc. at the work site of the work machine 1. The terminal device 105 is also referred to as a user terminal device 105 in the following, if necessary. The user terminal device 105 is connected to the communication line 101 via a communication device 104.

The user terminal device 105, for example, requests the control device 40 to provide the operational information of the work machine 1 controlled by user terminal device 105. In this case, the user terminal device 105 transmits a command, for example, to request the operational information to the control device 40 via the communication device 104 and the communication line 101. The control device 40 having received the command extracts the requested operational information of the work machine 1, and transmits the operational information to the user terminal device 105 via the communication device 103 and the communication line 101. The user terminal device 105 receives the requested operational information, and creates a daily work report for an operator who has operated the work machine 1, for example.

<Control System 100>

Figure 2:
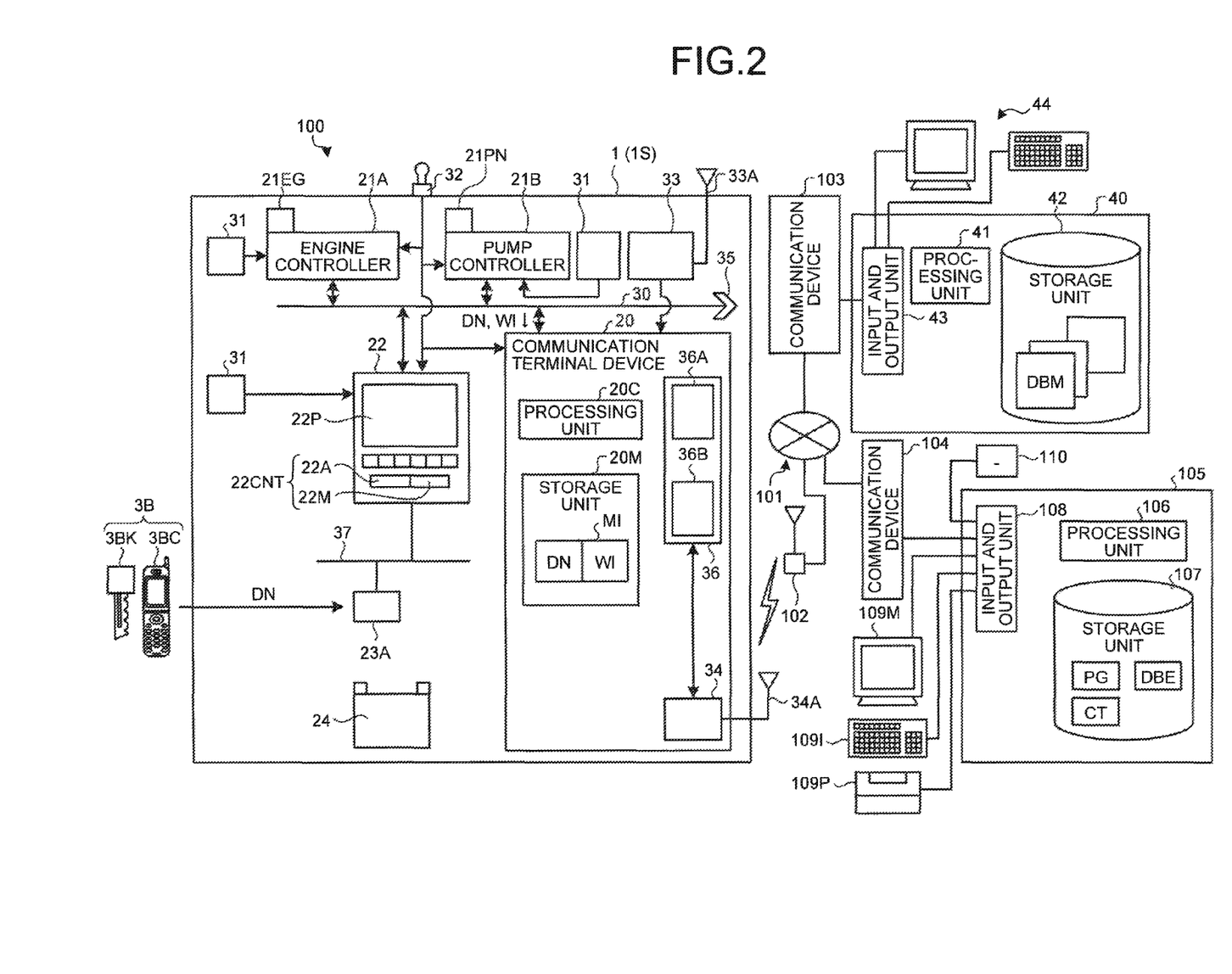
FIG. 2 is a diagram illustrating an exemplary control system of the work machine according to the embodiment of the present invention.

FIG. 2 is a diagram illustrating an exemplary control system 100 of the work machine according to the present embodiment. The control system 100 of the work machine includes an on-vehicle system 1S included in the work machine 1 and the control device 40 included in the control facility. The on-vehicle system 1S and the control device 40 exchange information via the communication line 101, the communication device 103, and the base station 102.

In the control system 100, the communication terminal device 20 of the on-vehicle system 1S collects operational information WI via an in-vehicle signal line 30 included in the on-vehicle system 1S. The communication terminal device 20 outputs the collected operational information WI to the outside of the work machine 1. For instance, the operational information WI is transmitted to the control device 40 via the communication line 101. Further, the communication terminal device 20 receives (acquires) the command or information transmitted from the control device 40 via the communication line 101. The communication terminal device 20 transmits the received command to an electronic device and the like of the work machine 1 to execute the same, or transmits the received information to the electronic device and the like, or stores the information in the storage device.

According to the present embodiment, as illustrated in FIG. 2, a case in which one work machine 1, one on-vehicle system 1S, one control device 40, and one terminal device 105 are connected via the communication line 101 for convenience of explanation; however, the number of the work machine 1, the control device 40, and the terminal device 105 is not limited. As illustrated in FIG. 1, there may be a plurality of the work machines 1. Also, there may be a plurality of the control devices 40 and terminal devices 105. Next, the on-vehicle system 1S will be described.

(On-Vehicle System 1S Included in Work Machine 1)

The on-vehicle system 1S included in the work machine 1 includes the communication terminal device 20, an engine controller 21A, a pump controller 21B, a monitor 22, various kinds of sensors 31, a key switch 32 as a switch, and a position detector 33. The electronic devices such as the engine controller 21A, the pump controller 21B, the monitor 22 and the communication terminal device 20 are electrically connected to the in-vehicle signal line 30 included in the work machine 1. These electronic devices are configured to be able to mutually communicate via the in-vehicle signal line 30. The electronic devices included in the work machine 1 and connected to the in-vehicle signal line 30 are not limited to the ones described above.

The key switch 32 is disposed near an operator seat. The key switch 32 is disposed among the electronic devices such as a storage battery 24, the communication terminal device 20, and the engine controller 21A. The power from the storage battery 24 as a power source included in the work machine 1 is supplied to the electronic devices in accordance with operation of the key switch 32. When the key switch 32 is turned ON, the power is supplied to the electronic devices from the storage battery 24. When the key switch 32 is turned OFF, the power supplied to the electronic devices from the storage battery 24 is cut off. Thus, since the key switch 32 is interposed among the storage battery 24, electronic devices and the communication terminal device 20, the power supplied from the storage battery 24 to the electronic devices is supplied or cut off. The power source of the on-vehicle system 1S is switched on by turning ON the key switch 32. Meanwhile, the signal indicating the ON/OFF state of the key switch 32 is received by each of the engine controller 21A, the pump controller 21B, the monitor 22 and the communication terminal device 20. The key switch 32 is not limited to the configuration using a key cylinder and may be a configuration like an electronic key using an ID key storing an identification number.

The communication terminal device 20 includes a processing unit 20C, a storage unit (first storage unit) 20M, a communication unit 34 as an output unit, and an input and output device 36. The processing unit 20C is formed of, for example, an electronic component having a function of arithmetic processing, such as CPU (Central Processing Unit). The storage unit 20M is formed of, for example, a RAM (Random Access Memory), a ROM (Read Only Memory), a flash memory, or a combination thereof. The storage unit 20M stores, for example, a computer program in which the command of the processing to be executed by the communication terminal device 20 is described, and the information necessary for the mentioned processing. In addition to that, the storage unit 20M stores work machine information MI. The work machine information MI includes an identification number DN as identification information, and the operational information WI of the work machine 1. The identification number DN may be formed of a number, a character, a code, or a combination thereof. Further, the identification number DN is assigned to an operator who is permitted to operate the work machine 1 and can operate the work machine 1, and further specifies each operator to identify the operator. Otherwise, the identification number DN is the information assigned to an operator such that the owner or the administrator, etc. of the work machine 1 can execute labor management and the like.

The communication terminal device 20, more specifically, the processing unit 20C, collects the operational information WI via the in-vehicle signal line 30. The communication terminal device 20 temporarily stores the collected operational information WI in the storage unit 20M. The processing unit 20C generates the work machine information MI at a predetermined timing by using the operational information WI and the identification number DN. After that, the processing unit 20C outputs the generated work machine information MI to the outside of the work machine 1 via the input and output device 36 and the communication unit 34.

The input and output device 36 is a control device that executes input and output of the information between the on-vehicle system 1S and the outside of the on-vehicle system 1S. According to the present embodiment, the input and output device 36 includes a gateway 36A and a start-up control unit 36B. The gateway 36A is a connection device to connect the in-vehicle signal line 30 to the communication line 101 located outside the work machine 1. The start-up control unit 36B can start up the on-vehicle system 1S by switching on the power source based on a command from the control device 40 even when the key switch 32 is in an OFF state.

The input and output device 36 is connected to the communication unit 34 included in the on-vehicle system 1S provided in the work machine 1. The communication unit 34 is connected to a communication antenna 34A, thereby enabling mutual wireless communication with the base station 102. The ground wave communication or the satellite communication may be used, for example, for the wireless communication. The communication unit 34 may execute communication by using other communication form such as the wireless LAN as described above. The base station 102 is connected to the communication line 101. The communication line 101 is connected to the communication device 103.

The communication unit 34 can exchange the information with the control device 40 via the base station 102, the communication line 101, and the communication device 103. A service connector 35 as an output unit is connected to the in-vehicle signal line 30. For instance, when an inspection device is connected to the service connector 35, it is possible to diagnose the condition of the electronic devices such as the communication terminal device 20, the engine controller 21A, the pump controller 21B and the monitor 22, or the state of the various kinds of sensors 31, and further it is possible to rewrite or read out the information stored in the storage unit 20M of the communication terminal device 20. For the inspection device, a terminal device such as a personal computer in which a dedicated tool or a dedicated application is installed may be used, for example. According to the present embodiment, the work machine 1 and the control device 40 can exchange the information by using the wireless communication. The information exchange between the work machine 1 and the control device 40 may be executed by connecting the terminal device such as the personal computer to the service connector 35 via a wire (communication cable) so as to output the operational information, etc. to the outside of the work machine 1 and also to transmit the various kinds of information from the control device 40 to the work machine 1. Further, the terminal device and the control device 40 may be connected by wire or wireless such that the operational information, etc. can be transmitted from the mentioned terminal device to the control device 40 and the various kinds of information, etc. can be transmitted from the control device 40 to the mentioned terminal device. Thus, the communication unit 34 or the service connector 35 is used as the output unit in order to output the information related to correlation between the identification number DN and the operational information, etc. to the outside of the work machine 1.

For the in-vehicle signal line 30, a CAN (Controller Area Network) may be used, for example. The in-vehicle signal line 30 is electrically connected to the service connector 35. As described above, the service connector 35 is connected to the terminal device or the like, thereby enabling the terminal device, the communication terminal device 20, the monitor 22, etc. to mutually exchange the information via the service connector 35 and the in-vehicle signal line 30. The kinds and number of the electronic devices connected to the in-vehicle signal line 30 are not limited to the above-described electronic devices. Next, other electronic devices connected to the in-vehicle signal line 30 will be described.

The engine controller 21A controls operation of an engine 21EG. The pump controller 21B controls a hydraulic system 21PN of the work machine 1. The hydraulic system 21PN is, for example, a hydraulic pump that is driven by the engine 21EG and discharges hydraulic oil. The pump controller 21B controls a swash plate angle of the hydraulic pump, thereby adjusting a discharge rate of the hydraulic oil. The hydraulic oil is supplied from the hydraulic pump to, for example, a hydraulic cylinder not illustrated.

The various kinds of sensors 31 are the sensors to detect the state of the work machine 1. The various kinds of sensors 31 may include, for example, a rotation sensor that detects a rotational speed (engine speed per unit time) of engine 21EG, a temperature sensor that detects a cooling water temperature of the engine 21EG (engine cooling water temperature), and a temperature sensor that detects a temperature of the hydraulic oil (hydraulic oil temperature). Note that the sensors 31 may be varied in accordance with, for example, specification of the work machine 1, such as the vehicle rank, type, and destination. According to the present embodiment, the sensors 31 are connected to each of the electronic devices such as the engine controller 21A, the pump controller 21B, and the monitor 22.

The position detector 33 is a device to implement, for example, RTK-GNSS (so-called Real Time Kinematic-Global Navigation Satellite Systems). The position detector 33 includes an antenna 33A for the RTK-GNSS. The position detector 33 detects a current position of the work machine 1. The position detector 33 is also one of the sensors to detect the state of the work machine 1. For example, a GPS (Global Positioning System) may be used as the position detector 33.

The monitor 22 is capable of displaying the various kinds of information related to the state of the work machine 1 on a screen 22P, and functioning as an input device when settings related to the operation of the work machine 1 are input and when the operator who operates the work machine 1 inputs the identification number. A push button switch or the like may be used as the input device. Further, the input device may be formed integrally with the monitor 22, or separately from the monitor 22. In the case where the input device is separately formed from the monitor 22, the input device may be disposed on, for example, a console inside an operator's cab of the work machine 1. The monitor 22 is, for example, a liquid crystal display device and may include a touch panel. The monitor 22 includes a control device 22CNT to implement the various kinds of functions that the monitor itself has. The control device 22CNT includes a processing unit 22A and a storage unit 22M. The processing unit 22A is formed of, for example, an electronic component having a function of arithmetic processing, such as CPU. The storage unit 22M is, for example, a RAM, a ROM, a flash memory, or a combination thereof. The storage unit 22M stores a computer program in which a command for the processing executed by the processing unit 22A is described, the setting information related to the operation of the work machine 1 set by the input device, an identification number DN to identify the operator who can operate the work machine 1, and so on.

According to the present embodiment, the monitor 22 communicates with the electronic devices, such as the communication terminal device 20, the engine controller 21A and pump controller 21B by using a communication protocol (first communications protocol) applied to the in-vehicle signal line 30.

According to the present embodiment, the monitor 22 is connected to a second in-vehicle signal line 37 that differs from the in-vehicle signal line 30. For the second in-vehicle signal line 37, a CAN (Controller Area Network) may be used, for example. For the second in-vehicle signal line 37, a second communication protocol different from the first communication protocol is applied. The second in-vehicle signal line 37 is connected to, for example, an information reader 23A provided as a sub electronic device. The information reader 23A communicates with the monitor 22 by using the second communication protocol. Thus, the monitor 22 may execute communication by using the two different kinds of communication protocols. Therefore, the monitor 22 enables communication between the devices by using the different communication protocols. A type and number of the sub electronic devices connected to the second in-vehicle signal line 37 are not limited to the above-described electronic devices. Also, other electronic device, such as the engine controller 21A, may execute communication by using two different kinds of the communication protocols, and may achieve the communication between the devices which use the different communication protocols. In other words, the mentioned other electronic device may be connected to the second in-vehicle signal line 37.

According to the present embodiment, the monitor 22 may obtain a fuel consumption amount and a fuel consumption rate. For example, the monitor 22 receives data of a fuel amount indicated by a fuel injection command signal that is supplied to a fuel injector not illustrated from the engine controller 21A illustrated in FIG. 1. Further, the monitor 22 measures an operating time of the engine 21EG with a counter included in the monitor 22 while the engine 21EG is operating. The monitor 22 obtains the fuel consumption amount by obtaining an accumulated fuel amount with a fuel consumption calculation unit included in the processing unit 22A based on the data of the fuel amount and the operating time of the engine. Further, the monitor 22 obtains a value, namely the fuel consumption rate, obtained by dividing the fuel consumption amount by an engine operating time (l/h) with the mentioned fuel consumption calculation unit.

According to the present embodiment, the monitor 22 controls the operator who can operate the work machine 1, besides displaying and inputting the various kinds of information. The monitor 22 recognizes, for example, the operator who can operate the work machine 1 by using the identification number DN assigned to the operator. According to the present embodiment, the storage unit 22M of the control device 22CNT stores the identification number DN that permits operation of the work machine 1 (hereinafter referred to as operation permission number, if necessary). As described above, since the identification number DN is the information to identify operability for the work machine 1, in the case the identification number DN of the operator matches the operation permission number stored in the monitor 22, the operator having the identification number DN can operate the work machine 1. In the following, procedure when the operator operates the work machine 1 and the processing executed by the monitor 22, etc. will be described.

The operator turns ON the key switch 32, and then inputs the identification number DN by using the input device of the monitor 22. The monitor 22 executes match determination between the input identification number DN and the operation permission number stored in the storage unit 22M. In this case, the input device corresponds to the information reader 23A described below.

A processing unit 22C executes the match determination between the identification number DN acquired from the information reader 23A and the operation permission number stored in the storage unit 22M. For instance, in the case where the identification number DN acquired by the control device 22CNT of the monitor 22 via the information reader 23A matches the operation permission number stored in the storage unit 22M, the processing unit 22C is in a state capable to start (operate) the work machine 1, more specifically, capable to start the engine 21EG. The processing unit 22A included in the monitor 22 generates a start permitting signal, and the start permitting signal is transmitted to a relay circuit not illustrated and connected to the monitor 22, to actuate the relay circuit. The relay circuit is disposed on an electrical circuit that connects the storage battery 24, a starter not illustrated, and the key switch 32. Upon receipt of the start permitting signal, the relay circuit closes, thereby making the electrical circuit connecting the key switch 32 with the starter to an energizable state. In other words, the power from the storage battery 24 becomes ready to be supplied to the starter via the key switch 32. At this point, when the key switch 32 is switched from an ON position to a START position by the operator, the power is supplied from the storage battery 24 to the starter via the key switch 32 to drive the starter. Subsequently, when the starter is driven, the engine 21EG starts. Upon start of the engine 21EG, the key switch 32 returns to the ON position from the START position. Meanwhile, in the case where the identification number DN matches the operation permission number, the processing unit 22A transmits the information indicating the match to the communication terminal device 20, and the storage unit 22M of the communication terminal device 20 stores the information indicating the match. In the case where the identification number DN acquired by the information reader 23A differs from the operation permission number stored in the storage unit 22M, the processing unit 22C neither generates a start permitting signal nor transmits a start permitting signal to the relay circuit. In other words, the work machine 1 cannot start. Through the above-described processing, the monitor 22 recognizes the operator who can operate the work machine 1.

The processing unit 22C may be configured not to execute the match determination between the identification number DN acquired by the information reader 23A and the operation permission number stored in the storage unit 22M. More specifically, when the identification number DN is acquired by the control device 22CNT of the monitor 22 via the information reader 23A, the processing unit 22A generates the start permitting signal, and the acquired identification number DN is stored in the storage unit 22M. In other words, the processing unit 22A may be configured to generate the start permitting signal, using acquisition of the identification number DN as a trigger. In the case of using an ID key 3B later described, the processing unit 22C may also be configured not to execute the match determination.

An exemplary processing in which the monitor 22 authenticates the operator by using the ID key 3B will be described. While the key switch 32 of the work machine 1 is turned ON, the operator allows the information reader 23A to read the identification number DN stored in the ID key 3B personally carried by the operator. In this case, the information reader 23A may read the identification number DN stored in the ID key 3B by using wireless communication, such as by using an immobilizer key. The information reader 23A acquires the identification number DN from the ID key 3B to authenticate the operator who can operate the work machine 1, and transmits the acquired identification number DN to the monitor 22, more specifically, the control device 22CNT, via the second in-vehicle signal line 37. According to the present embodiment, an electronic key 3BK or a mobile communication terminal device 3BC may be used for the ID key 3B as illustrated in FIG. 2, but not limited thereto as long as being capable of storing the identification number DN. For example, an ID card may be used as well. The processing unit 22A of the control device 22CNT executes the match determination between the operation permission number stored in the storage unit 22M and the identification number DN acquired from the information reader 23A.

In the case where both numbers match, the processing unit 22C generates, for example, the start permitting signal and transmits the start permitting signal to the relay circuit not illustrated. After that, the operator switches the key switch 32 to the START position to drive the starter in order to start the engine 21EG. Then, the engine 21EG starts. The processing unit 22A may be configured to display, on a screen 22P, the information indicating that the operator who carries the ID key 3B used for authentication is permitted to operate the work machine 1. In the case where the identification number DN and the operation permission number do not match, the processing unit 22A neither generates the start permitting signal nor transmits the start permitting signal to the relay circuit not illustrated. The processing unit 22A may be configured to display, on the screen 22P, the information indicating that the operator who carries the ID key 3B used for authentication is not permitted to operate the work machine 1.

The operation permission number is changed by rewriting and deleting the operation permission number stored in the storage unit 22M of the monitor 22. Also, a plurality of the operation permission numbers may be additionally stored in the storage unit 22M. In this case, the control device 22CNT of the monitor 22 acquires the operation permission number or the additional operation permission numbers as changed via the communication terminal device 20 and the in-vehicle signal line 30, and allows the changed numbers to be stored in the storage unit 22M. In the case of deleting the operation permission number, the control device 22CNT acquires a command to delete the operation permission number via the communication terminal device 20 and the in-vehicle signal line 30, and deletes the corresponding operation permission number from the storage unit 22M. The operation permission number stored in the storage unit 22M of the monitor 22 may be rewritten, deleted, or added via the terminal device connected to the service connector 35 or the information reader 23A, for example. The identification number DN may be changed or added via the input device of the monitor 22 or an input device separate from the monitor 22, or may be changed by a terminal device connected with the service connector 35.

Also, information related to change or addition of the operation permission number may be transmitted to the work machine 1 by the remote control of control device 40, thereby changing or adding the operation permission number stored in the storage unit 22M of the monitor 22. Meanwhile, as described above, the work machine 1 may include both of a means whereby the operator can input the identification number DN via the monitor 22 and another means whereby the operator can input the identification number DN via the ID key 3B (information reader 23A), or may include one of these means. In the case where the work machine 1 includes both means, one of the means to be valid may be preliminarily set by using the monitor 22, so that the identification number DN can be acquired. Next, the control device 40 will be described.

(Control Device 40)

The control device 40 is, for example, a computer. The control device 40 acquires the work machine information MI transmitted from the work machine 1 and controls the operating condition of the work machine 1. According to the present embodiment, the control device 40 can control a plurality of the work machines 1; however, the number of work machines 1 controlled by the control device 40 is not limited.

The control device 40 includes a processing unit 41, a storage unit 42, and an input and output unit 43. The processing unit 41 is formed of, for example, an electronic component having a function of arithmetic processing, such as CPU. The storage unit 42 is, for example, a RAM, a ROM, a flash memory, a hard disk drive, or a combination thereof. The input and output unit 43 executes input and output of the information with the processing unit 41, and further executes input and output of the information between the communication device 103 (second communication device) connected to the control device 40 and the processing unit 41.

The input and output unit 43 of the control device 40 is electrically connected to the communication device 103. The communication device 103 is electrically connected to the communication line 101. With this configuration, the control device 40 is connected to the communication line 101 via the communication device 103. The control device 40, more specifically, the processing unit 41 of the control device 40 receives (acquires) the work machine information MI and other information transmitted from the communication terminal device 20 of the work machine 1 via the communication line 101 and the communication device 103. Further, the processing unit 41 transmits a command or information to the work machine 1 via the communication device 103 and the communication line 101.

The control device 40 totalizes, for example, the work machine information MI acquired from the work machine 1 for each work machine 1, and generates a work machine information database DBM. The work machine information database DBM is stored in the storage unit 42. The processing unit 41 can display the work machine information MI or the contents of the work machine information database DBM, for example, on a display device 44 electrically connected to the input and output unit 43. Next, the user terminal device 105 will be described.

(User Terminal Device 105)

A user terminal device 105 is, for example, a computer. The user terminal device 105 acquires necessary work machine information MI from the control device 40 via the communication line 101 and the communication device 104. The work machine information MI acquired by the user terminal device 105 is the work machine information MI related to the work machine 1 controlled or owned by a person who uses the user terminal device 105.

The user terminal device 105 acquires the work machine information MI transmitted from the work machine 1 and controls the operating condition of the work machine 1. According to the present embodiment, the number of the work machine 1 controlled by the user terminal device 105 is not limited.

The user terminal device 105 includes a processing unit 106, a storage unit 107, and an input and output unit 108. The processing unit 106 is formed of, for example, an electronic component having a function of arithmetic processing, such as CPU. The storage unit 107 is, for example, a RAM, a ROM, a flash memory, a hard disk drive, or a combination thereof. The input and output unit 108 executes input and output of the information with the processing unit 106, and also executes input and output of the information between the communication device 104 connected to the user terminal device 105 and the processing unit 106.

The storage unit 107 stores a correlation program PG and a correlation database CT. The processing unit 106 reads out and executes the correlation program PG, thereby generating operator information DBE, correlating the correlation database CT to the work machine information MI acquired via the communication line 101. The storage unit 107 stores the generated operator information DBE.

According to the present embodiment, the input and output unit 108 is electrically connected to the communication device 104, a display device 109M, an input device 109I, an output device 109P, and a reading device 110. The user terminal device 105 is connected to both or either one of the display device 109M and the output device 109M as a report output device. The display device 109M is, for example, a liquid crystal display. The input device 109I is, for example, a keyboard, a mouse, or a touch panel. The output device 109P is, for example, a printer. The reading device 110 is, for example, a device to read out the information stored in a storage device (storage medium) such as a DVD-ROM or a memory card from the storage medium.

As described above, the processing unit 106 of the user terminal device 105 acquires the work machine information MI from the work machine information database DBM stored in the storage unit 42 of the control device 40 via the communication line 101 and the communication device 104. In addition to that, the user terminal device 105 can acquire the necessary work machine information MI by the reading device 110 reading the storage medium which stores the work machine information MI read out from the work machine information database DBM.

<Work Machine Information MI and Work Machine Information Database DBM>

Figure 3:
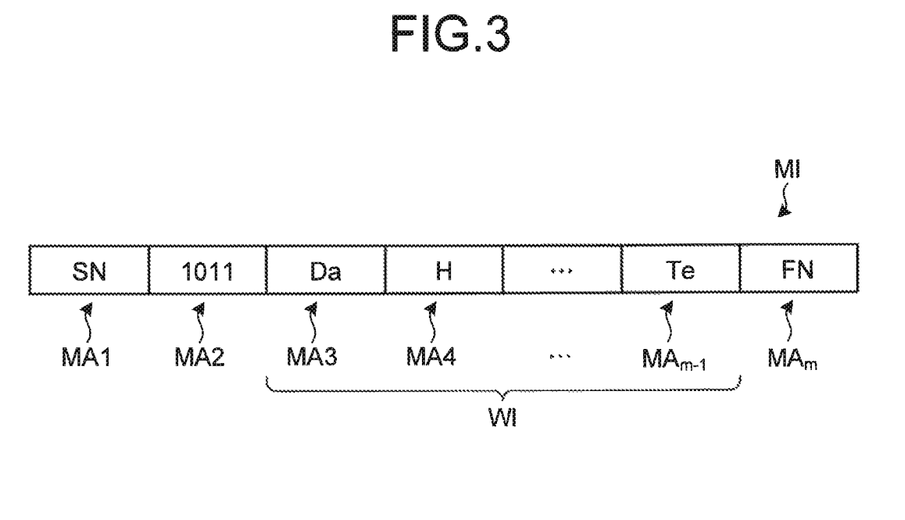
FIG. 3 is a conceptual diagram illustrating an example of work machine information.
Figure 4:
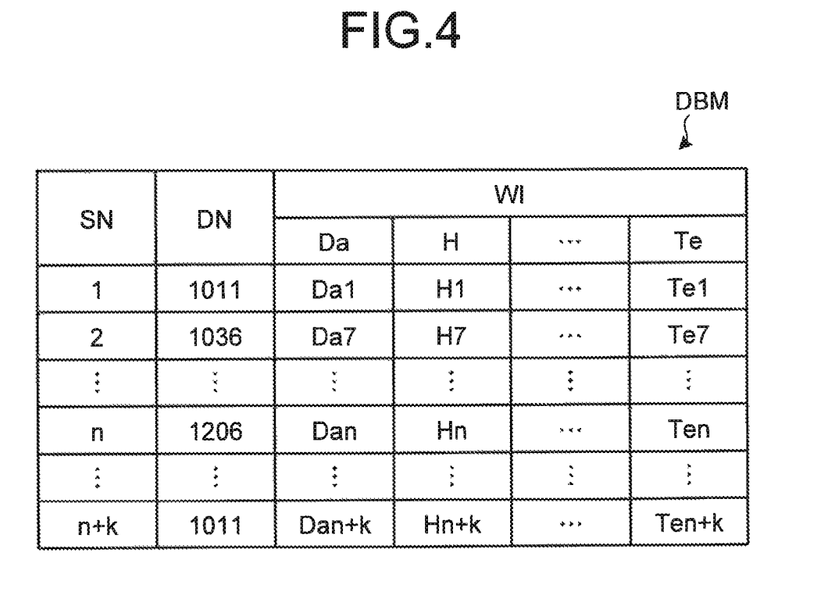
FIG. 4 is a conceptual diagram illustrating an example of a work machine information database.

FIG. 3 is a conceptual diagram illustrating an example of the work machine information MI. FIG. 4 is a conceptual diagram illustrating an example of the work machine information database DBM. The work machine information MI includes, for example, areas MA1, MA2, . . . , MA−1, MAm (m is an integer equal to 3 or more) where information is stored. The area MA1 stores a work number SN. The work number SN, in principle, counts a work executed during a period from staring the engine to stopping the engine 21EG illustrated in FIG. 2 as one work unit (hereinafter conveniently referred to as work unit). Every time one work unit finishes, one is added to the work number SN. The respective work executed by the work machine 1 can be discriminated by the work number SN. For instance, in the case where the work numbers SN in a plurality of work units are different even though the identification numbers DN are identical, the respective work units are determined to have different contents of work. The storage unit 20M may preliminarily store machine information of the work machine 1 so as to transmit the work machine information MI including the machine information of the work machine 1 to the control device 40. For the machine information of the work machine 1, the information which may individually identify the work machine 1, such as a phone number of the communication terminal device 20, a product serial number of the communication terminal device 20, or a product serial number of the work machine 1 may be used.

Now, the work machine information MI generated for each operator will be described in detail. First, a description will be given for a case in which a plurality of operators operates the same work machine 1 on the same day and each of the operators executes one work (one work unit).

For instance, as for a specific work machine 1, the key switch 32 of the work machine 1 is turned ON by an operator (first operator). When the engine 21EG is started, the processing unit 20C of the communication terminal device 20 receives a signal from the key switch 32 and determines that one work, namely one work unit, is started by using the receipt of the signal as a trigger. Determining a start of the work unit may also be triggered by use of a signal based on the match determination by inputting the identification number DN with the input device of the monitor 22 or based on the match determination of the identification number DN by the ID key 3B, or by use of a signal simply indicating that the identification number DN has been input, instead of using the signal indicating ON/OFF operation of the key switch 32.

Assume that the first operator finishes the work and later turns OFF the key switch 32. After that, assume that another operator (second operator) executes a work by starting up the same work machine 1 on the same day, using the identification number DN of the second operator. The storage unit 20M of the communication terminal device 20 stores the information indicating that the key switch 32 is turned ON or turned OFF by the first operator, correlated to the identification number DN of the first operator. The processing unit 20C compares the identification number DN of the first operator read out from the storage unit 20M with the identification number DN of the second operator newly acquired. As a result of the comparison, the processing unit 20C detects that the identification number DN of the first operator already stored differs from the newly acquired identification number DN of the second operator, and recognizes a change of the operator, and then generates the work machine information MI in which the work executed by the first operator is assigned with a work number SN as one work unit.

Assume that the second operator finishes the work and turns OFF the key switch 32. The processing unit 20C generates the work machine information MI in which the work executed by the second operator is assigned, as one work, with a work number SN different from the work number SN assigned to the work unit of the first operator. In other words, the work machine information MI is generated for each operator.

Next, a description will be given for a case in which the plurality of operators operates the same work machine 1 on the same day and each of the operators executes a plurality of works (plurality of work units).

As an example of this case, a description will be given for a case in which a first work (first work unit) executed by the first operator is finished and later a work executed by the second operator is finished, and then a work is executed by the first operator again on the same day after the key switch 32 is once turned OFF. More specifically, assume that the first operator starts up the work machine 1 by using the operator's own identification number DN again after the first work. In this case, the first operator executes the second work on the same day, but the processing unit 20C generates a work machine information MI in which the second work is assigned with a work number SN different from the first work (first work unit). In other words, in the case where the same operator executes the works with the same work machine 1 on the same day at different timings, the processing unit 20C sets the work number SN for each of the work units, deeming that the different works are executed. One work is defined as a work executed during the period from turning ON the key switch 32 until turning OFF the key switch, and deemed as one work unit. When the work is executed a plurality of times, a plurality of work units are defined in accordance with the number of times the work has been executed, and the work number SN is set to each of the work units.

In the above-described case, the same operator (first operator in the above case) executes the plurality of works (plurality of work units) with the same work machine 1 not successively. However, in a next case, a description will be given for a case in which the same operator executes the plurality of the works (plurality of work units) successively.

In other words, in the case where the works are executed successively by the first operator with the same work machine 1 on the same day, the work machine information MI is generated as follows. For instance, assume that the first operator executes a work with the work machine 1 in the morning and turns OFF the key switch 32 to finish the work, and in the afternoon the operator turn ON the key switch 32 to start a work and then turns OFF the key switch 32 to finish the work at the evening on the same day. For instance, there is a case in which successive work by the first operator is executed by an excavator, and a work content executed by the first operator in the morning is excavating, and the work content executed by the first operator in the afternoon is loading sediment on a dump truck. Here, the processing unit 20C generates the work machine information MI in which one work number SN is assigned, as a work (one work unit), to the work in the morning and the work in the afternoon executed by the first operator regardless of the difference between the work content in the morning and that in the afternoon. In other words, in the case where the works are successively executed by the same operator (same identification number DN) on the same day without changing to any other operator, the processing unit 20C generates one work machine information MI including the information related to the latter work even though the key switch 32 is once turned OFF. In other words, as described above, the work number SN is assigned to the work executed during the period from starting to stopping the engine 21EG as one work unit, in principle; however, in the case where the same operator successively executes the plurality of works with the same work machine 1 on the same day, the successive works are deemed integrally as one work unit and counted as one work number SN. The processing unit 20C determines whether one work executed during the period from turning ON the key switch 32 until turning OFF the same is executed a plurality of times and whether the plurality of works is successively executed by the same operator. In the case where the plurality of works is successively executed by the same operator, the works are defined as one work unit and one work number SN is set for the work unit.

The work machine information MI is generated per day, for example. For instance, assume that the first operator executes a work with a work machine 1 for a plurality of days without changing to other operator. The first operator turns ON the key switch 32 when starting the work and turns OFF the key switch 32 when finishing the work every day. Note that daily work contents may be either same or different. The processing unit 20C measures the time with a clock not illustrated and built inside the communication terminal device 20, and generates the work machine information MI, using the acquired information related to a date and time. In other words, the processing unit 20C assigns each of the work unit with the work number SN with respect to the first operator as described above, and generates the work machine information MI in which the information related to date and time are further assigned. In the case where operators are changed in the work executed for a plurality of days, the processing unit 20C assigns each work unit with one work number SN with respect to each operator, and generates the work machine information MI in which the information related to date and time is further assigned, as described above.

The area MA2 stores the identification number DN. In the example illustrated in FIG. 3, the number 1011 is the identification number DN. The operational information WI of the work machine 1 is stored in the areas from MA3 to MAm−1. The operational information WI may include, for example, an operating date Da, an operating time H, and an engine water temperature Te of the engine 21EG illustrated in FIG. 2. Information FN indicating a tail end of the work machine information MI is stored in the area MAm. According to the present embodiment, in the work machine information MI, the operational information WI is stored in m−3 areas out of the m areas.

According to the present embodiment, the work machine information MI includes the identification number DN and the operational information WI acquired by the identification number DN during the period from starting to stopping the engine 21EG illustrated in FIG. 2. For instance, the work machine information MI illustrated in FIG. 3 includes the operational information WI acquired at the communication terminal device 20 during the period from starting to stopping the engine 21EG of the work machine 1 where the operator having the identification number DN 1011 rides.

The communication terminal device 20 illustrated in FIG. 2 generates the work machine information MI based on the operational information WI corresponding to the identification number DN, and transmits the generated information to the control device 40 via the communication line 101, for example, once a day at a predetermined time. The control device 40 totalizes the received work machine information MI, for example, for one same work machine 1, and generates the work machine information database DBM as illustrated in FIG. 4. The work machine information database DBM includes the plurality of work machine information MI acquired from the same work machine 1. In other words, the work machine information database DBM includes the plurality of identification numbers DN acquired from the same work machine 1, and the operational information WI corresponding to each of the identification numbers DN.

The work machine information database DBM totalizes and stores the work machine information MI of a predetermined period, more specifically, the identification number DN and the operational information WI corresponding the identification number DN. The predetermined period is optionally set, for example, one day, one week, one month, or 5 week days in accordance with the purpose at the time of analyzing the work machine information MI. The operational information WI corresponding to the same identification number DN may be included in the database of the predetermined period. In such a case also, the operational information WI of the same identification number DN can be discriminated because the work numbers SN are different. For instance, the example illustrated in FIG. 4 includes two identification numbers DN 1011, having different work numbers SN 1 and n+k respectively. Therefore, both of the operational information WI is discriminated.

The operational information WI with respect to the identification number DN is described in the work machine information database DBM and the work machine information MI included therein. In the case where the user terminal device 105 having acquired the work machine information MI displays the acquired work machine information MI as it is on the display device 109M or outputs the acquired work machine information MI from the output device 109P, the owner or the administrator of the work machine 1 may not be able to grasp the correlation between the operator who has executed the work with the work machine 1 and the operational information WI or the like. In other words, in terms of identifying the operator, it is hard to grasp which operator executed the work for how long on which date, or how the state of the work machine 1 was while which operator was executing the work, and so on.

Therefore, according to the present embodiment, the user terminal device 105 illustrated in FIG. 2 correlates the work machine information MI to the correlation database CT by using the correlation program PG. Thus, the user terminal device 105 generates the operator information DBE in which the operator having executed the work with the work machine 1 is correlated to the operational information WI. Since the operator having executed the work with the work machine 1 is correlated to the operational information WI in the operator information DBE, the owner or the administrator of the work machine 1 (hereinafter suitably referred to as user of the work machine 1) can easily understand a relation between the operator and the operational information WI.

<Correlation Database CT>

Figure 5:
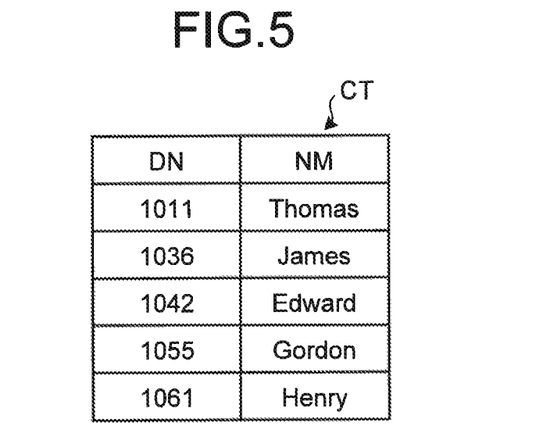
FIG. 5 is a diagram illustrating an exemplary correlation database stored in a storage unit of a user terminal device.

FIG. 5 is a diagram illustrating an exemplary correlation database CT stored in the storage unit 107 of the user terminal device 105. The correlation database CT is the information indicating the correlation between the operator who operates the work machine 1 and the identification number DN. The operator who operates the work machine 1 is indicated by a name NM according to the present embodiment, but what is essential is to be able to identify the operator, and therefore identification of the operator is not limited to the operator's name NM. For instance, the operator's nickname and the like may be used instead of the operator's name NM.

In the example illustrated in FIG. 5, the operator's names NM correlated to the identification numbers DN 1011, 1036, 1042, 1055, and 1061 are Thomas, James, Edward, Gordon, and Hemry respectively. The user of the work machine 1 preliminarily creates the relation between the operator the user manages and the identification number DN assigned to the operator, and further has the relation stored in the storage unit 107 of the user terminal device 105, for example.

<Correlating Operator to Operational Information WI>

Figure 6:
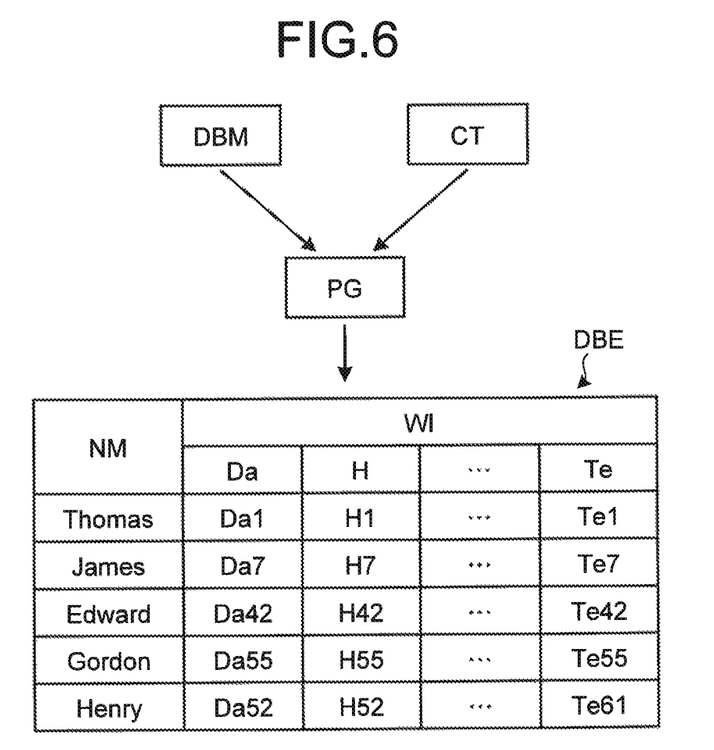
FIG. 6 is a diagram illustrating a method of correlating operators to operational information.

FIG. 6 is a diagram illustrating a method of correlating the operators to the operational information WI. To correlate the operators to the operational information WI, the correlation program PG is used as a computer program that controls the work machine. The correlation program PG is a computer program that causes the computer to execute processing of correlating the operator's name NM to the operational information WI. The computer according to the present embodiment is the user terminal device 105.

The correlation program PG causes the user terminal device 105 to execute processing of generating the correlation between the operator and the operational information WI by using the correlation between the identification number DN and the operational information WI and the correlation between the operator who operates the work machine 1 and the identification number DN. According to the present embodiment, the correlation between the identification number DN and the operational information WI is the work machine information MI or the work machine information database DBM. According to the present embodiment, the correlation between the operator who operates the work machine 1 and the identification number DN corresponds to the correlation database CT.

The correlation program PG causes the user terminal device 105 to execute processing of replacing the identification number DN, such as the work machine information MI, with the operator's name NM correlated to the same identification number DN included in the correlation database CT. When the user terminal device 105 executes the processing, the operator information DBE is generated. The operator information DBE indicates the correlation between the operator's name NM and the operational information WI. The administrator or the like of the work machine 1 can easily understand from the operator information DBE which operator executed what kind of work, or how the state of the work machine 1 was during the work, for example.

Figure 7:
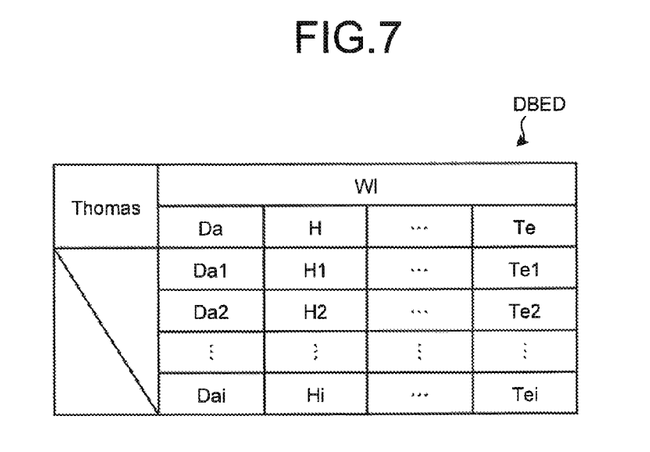
FIG. 7 is a diagram illustrating an example of operator information in which operational information is totalized for one operator for a predetermined period.

FIG. 7 is a diagram illustrating an example of operator information DBED in which the operational information WI is totalized with respect to one operator for a predetermined period. According to the present embodiment, the user terminal device 105 may totalize the operational information of the predetermined period to generate the correlation between the operator and the operational information WI. For instance, the operator information DBED illustrated in FIG. 7 is the totalized operational information WI for one operator during the operating dates from Da1 to Dai. In this case, the user terminal device 105 acquires the work machine information MI from the control device 40 illustrated in FIG. 2. Then, the user terminal device 105 extracts, for a predetermined period, the operational information WI corresponding to the identification number DN of the operator for whom the operational information WI is totalized and arranged in time series, for example. Thus, the operator information DBED in which the operational information WI of the predetermined period is totalized for one operator is done.

The user terminal device 105 may create a report by executing statistical processing for the operational information WI included in the operator information DBED to obtain an average fuel consumption rate, an operating time, an accumulated operating time, etc. of the operator. In this case, the user terminal device 105 may classify a time zone in which the operator executes the work into, for example, an early shift time zone, a late shift time zone, and a night shift time zone, based on the time information included in the operational information WI. This enables grasping the time zone in which the operator has executed the work, thereby enabling attendance management of the operator.

The above-described report corresponds to the operator information DBED in which, for example, the operational information WI of the one operator is totalized, including the operator information, more specifically, personal information that specifies the operator. The report may be output to (displayed on the screen of) the display device 109M of the terminal device 105 such that the user of the work machine 1 can confirm the report or may be output to (printed on) a paper by the output device 109P such that the user of the work machine 1 can confirm.

Figure 8:
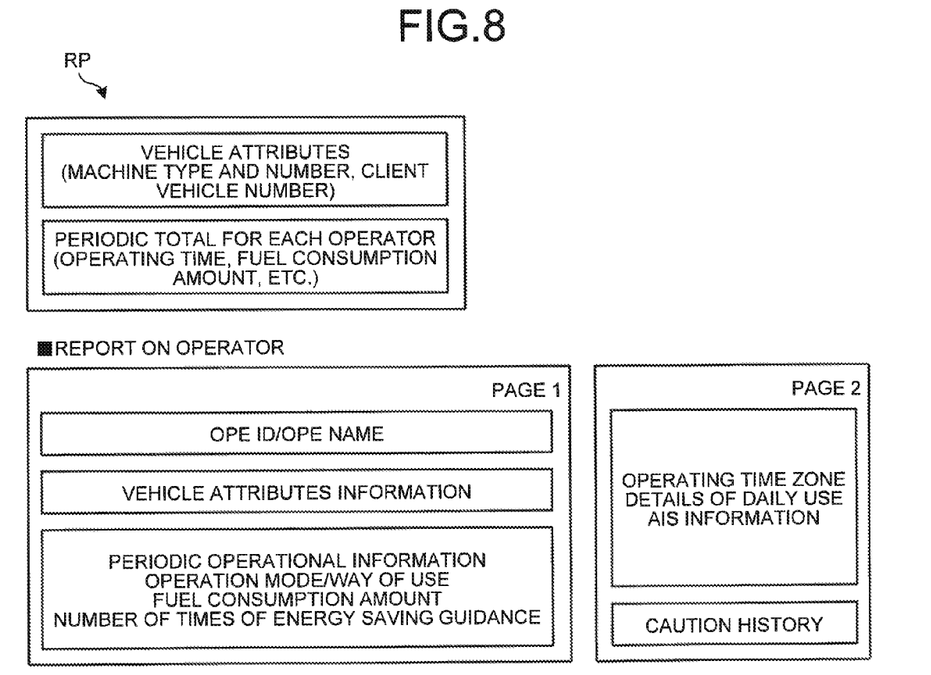
FIG. 8 is a diagram illustrating an exemplary configuration of a content to be output in the case of outputting a report to a report output device such as a display device 109M or an output device 109P.

FIG. 8 is a diagram illustrating an exemplary configuration of contents to be output in the case of outputting a report RP to the report output device such as the display device 109M or the output device 109P. The report RP illustrated in FIG. 8 may be used for the attendance management whereby which operator has operated the work machine 1 in which time zone on which date is managed, and also used to grasp a difference of an operating method of each operator as well as each operator's response status to a caution, etc. The report RP includes vehicle attributes including a machine type, a machine number, a client vehicle number and so on, and information related to a periodic total for each operator. The information related to the periodic total includes, for example, the operating time and the fuel consumption amount. The periodic total for each operator includes totalized values during a report period for the operator to be reported. The fuel consumption amount included in the totalized values includes, for example, a fuel consumption amount during the report period, a fuel consumption rate under the operating state, $CO_2$ emission proportional to the fuel consumption rate or the fuel consumption amount under the actual operation state.

On page 1 of the report RP, items of an ID and a name (OPE ID/OPE NAME) of the operator to be reported in the report RP, the vehicle attributes information, and periodic operational information are displayed. The operator's name is the personal information of the operator. The vehicle attributes information includes the machine type, machine number, client vehicle number, etc. of the work machine used by the operator to be reported.

The periodic operational information includes the operating condition of the operator to be reported and the information totalizing data of the way of using the work machine 1 during the report period. The periodic operational information includes, for example, work mode/way of use, the fuel consumption amount, and number of times of energy saving guidance. The information related to the operating condition of the operator includes, for example, the operating time, the actual operation time, or a ratio of an idling time to the operating time. For instance, numerical information such as the operating time may be output to the report RP using a graphic, like a graph. In the case where the work machine 1 is the excavator, the information related to the way of using the work machine 1 may include, for example, an excavating time, a hoist time, a ratio of a travel time or an attachment time to the actual operation time, a use time and an occupancy ratio of respective modes during the actual operation, a use time and an occupancy ratio of respective travel modes, a hydraulic relief time, and a ratio thereof to the actual operation time. The energy saving guidance includes, for example, kinds and number of times of the energy saving guidance displayed on the monitor 22 of the work machine 1.

On page 2 of the report RP, an item of daily data of the operator to be reported during the report period is displayed. The daily data includes, for example, the operating time zone, details of daily use, AIS information, and a caution history. The details of daily use include, for example, an operation map, a map of time zone when the caution indicating failure occurrence is generated, a work start time, a work finish time, the operating time, the accumulated operating time, the actual operation time, the hydraulic relief time, the fuel consumption rate and the fuel consumption amount in the actual operation. The contents of the AIS information include, for example, the idling time of the engine 21EG and a setting status and number of times of actuating an automatic idling stop function whereby an idling state of the engine 21EG is automatically stopped when the idling state continues for a predetermined time. The caution history is illustrated by, for example, a map daily indicating whether each of the cautions (failure or abnormality) has been generated.

Further, the user terminal device 105 may be configured to, for example, totalize operational information WI for each of the plurality of operators having operated the same work machine, using the operator information DBE illustrated in FIG. 6 and generate information that enables comparison among the operators. In addition, the user terminal device 105 may execute various totalizing, using the operator information DBE or the operator information DBED. In this case also, the user of the work machine 1 can easily grasp which operator executed what kind of work or how the state of the work machine 1 was during the work, and therefore convenience in analyzing the information may be improved.

As described above, according to the present embodiment, the correlation between the name NM of the operator and the operational information WI is generated based on the relation between the identification number DN of the operator and the operational information WI by using the relation between the name NM of the operator and the identification number DN. Therefore, the user of the work machine 1 can easily grasp, for example, the relation between the operator and the operational information WI of the work machine 1 based on the operator information DBE.

According to the present embodiment, the control device 40 may be used by a business operator that provides a service of collecting and totalizing the work machine information MI of the work machine 1 for the user of the work machine 1. In general, the name NM and the like of the operator are the personal information of the operator, and therefore in some countries or regions, storing such a personal information in the control device 40 may be legally restricted. Further, even in the case where storing the personal information of the operator in the control device 40 is allowed, time and labor for protecting the personal information may be required, such as by signing an agreement associated with handling the personal information signed between the business operator that provides the service with the control device 40 and the user of the work machine 1, securing security, or auditing protecting state of the personal information. Therefore, it is difficult to store the personal information of the operator in the control device 40 of the business operator that provides the mentioned service.

According to the present embodiment, the personal information of the operator is stored in the user terminal device 105 in the form of the correlation database CT. Therefore, it is not necessary to store the personal information of the operator in the control device 40 of the business operator that provides the mentioned service. Accordingly, the user can easily grasp the relation between the operator and the operational information WI of the work machine 1 while reducing the time and labor to protect the personal information of the operator. This allows the business operator that provides the mentioned service to easily provide the above described service. The user of the work machine 1 also achieves to easily generate the correlation between the operator and the operational information WI when the correlation database CT and the correlation program PG are prepared. In this case, the correlation program PG that causes the computer to generate the correlation between the operator and the operational information WI is distributed, for example, from the business operator that provides the mentioned service to the user of the work machine 1. With use of the above described control method, control computer program and control system for controlling the operational information of the work machine, the user of the work machine 1 can execute, for example, the labor management of each operator, provide operation guidance based on the result of fuel consumption amount, etc. of each operator, and implement the preventive maintenance and fault diagnosis for the work machine 1.

The embodiment of the present invention has been described above, but the embodiment of the present invention is not limited to the contents thereof. Further, the components disclosed above may include components easily conceivable by a person skilled in the art and substantially equivalent, i.e., components included in the equivalent scope. Also, the components disclosed above may be suitably combined. Additionally, at least one of omission, replacement and modification of the components may be made without departing from the scope of the technical concepts of the embodiment of the present invention.

REFERENCE SIGNS LIST

1 WORK MACHINE
3B ID KEY
1S ON-VEHICLE SYSTEM
20 COMMUNICATION TERMINAL DEVICE
20C PROCESSING UNIT
20M STORAGE UNIT
21A ENGINE CONTROLLER
21B PUMP CONTROLLER
22 MONITOR
22CNT CONTROL DEVICE
23A INFORMATION READER
30 IN-VEHICLE SIGNAL LINE
32 KEY SWITCH
34 COMMUNICATION UNIT
40 CONTROL DEVICE
41 PROCESSING UNIT
42 STORAGE UNIT
100 CONTROL SYSTEM
105 TERMINAL DEVICE (USER TERMINAL DEVICE)
106 PROCESSING UNIT
107 STORAGE UNIT
CT CORRELATION DATABASE
DBE, DBED OPERATOR INFORMATION
DBM WORK MACHINE INFORMATION DATABASE
DN IDENTIFICATION NUMBER
MI WORK MACHINE INFORMATION
WI OPERATIONAL INFORMATION

The invention claimed is:

1. A control method for a work machine, wherein the control method uses a terminal device connected to a control device via a communication line, the control device controlling operational information acquired by the work machine, the control method comprising:
   acquiring, by the terminal device, a correlation between identification information for identifying operability for the work machine and the operational information of the work machine, and
   generating, by the terminal device, a correlation between personal information that can identify an operator who operates the work machine and the operational information by using the correlation between the identification information and the operational information and a correlation between the personal information that can identify the operator and the identification information.

2. The control method for a work machine according to claim 1, wherein the operational information for a predetermined period is totalized to generate the correlation between the personal information that can identify the operator and the operational information.

3. A control method for a work machine, wherein the control method uses a terminal device connected to a control device via a communication line, the control device controlling operational information acquired by the work machine, the control method comprising:
   acquiring, by the terminal device, a correlation between identification information for identifying operability for the work machine and the operational information of the work machine; and
   generating, by the terminal device, a correlation between personal information that can identify an operator who operates the work machine and the operational information by using the correlation between the identification information and the operational information and a correlation between the personal information that can identify the operator and the identification information,
   wherein the operational information includes at least one of an operating date, an operating time, and fuel consumption information.

4. A control non-transitory computer readable media for a work machine, causing a computer to execute processing of
   acquiring a correlation between identification information for identifying operability for the work machine and operational information of the work machine acquired by the work machine; and
   generating, by a terminal device connected to a control device via a communication line, the control device controlling the operational information, a correlation between personal information that can identify an operator who operates the work machine and the operational information by using a correlation between the identification information and the operational information of the work machine and a correlation between the personal information that can identify the operator and the identification information.

5. The control non-transitory computer readable media for a work machine according to claim 4, causing the computer to execute processing of totalizing the operational information for a predetermined period to generate a correlation between the operator and the operational information.

6. A control system for a work machine, comprising a terminal device connected to a control device via a communication line, the control device controlling operational information acquired by the work machine and configured to acquire a correlation between identification information for identifying operability for the work machine and the operational information of the work machine, and generate a correlation between personal information that can identify an operator who operates the work machine and the operational information by using the correlation between the identification information and the operational information and a correlation between the personal information that can identify the operator and the identification information.

7. The control system for a work machine according to claim 6, wherein the operational information for a predetermined period is totalized to generate the correlation between the personal information that can identify the operator and the operational information.

8. The control method for a work machine according to claim 6, wherein the control device is used by a business operator that provides a service for an administrator of the work machine, and the terminal device is used by an administrator of the work machine.

9. The control method for a work machine according to claim 6, wherein the correlation between the personal information that can identify the operator and the identification information is stored in the terminal device.

10. A control system for a work machine, the control system using a work machine that acquires operational information, a control device that controls the operational information, a terminal device that controls personal information that can identify an operator and identification information, and a report output device that outputs the operational information including the personal information that can identify the operator, the control system comprising:

a storage unit configured to store a correlation between the identification information for identifying operability for the work machine and the operational information; and     an output unit configured to output the correlation to outside of the work machine,     wherein the control device receives the correlation and further transmits the correlation to the terminal device, and     wherein the terminal device is connected to the control device via a communication line and includes a computer program configured to execute processing of receiving the correlation and generating a correlation between the operational information and the personal information that can identify the operator by using the received correlation and a correlation between the personal information that can identify the operator and the identification information, and by the processing, the operational information including the personal information that can identify the operator is output to the report output device.

\* \* \* \* \*